United States Patent [19]
Bucher et al.

[11] 3,814,849
[45] June 4, 1974

[54] LEAKAGE CURRENT COMPENSATING CIRCUIT FOR SEMICONDUCTOR IMAGE SENSOR

[75] Inventors: Hans R. Bucher, Boulder; David H. Wartburg, Broomfield, both of Colo.

[73] Assignee: Ball Brothers Research Corporation, Boulder, Colo.

[22] Filed: Oct. 13, 1972

[21] Appl. No.: 297,516

[52] U.S. Cl. .......................... 178/7.2, 178/DIG. 29
[51] Int. Cl. .......................... H04n 5/34
[58] Field of Search... 178/7.2 R, DIG. 29, DIG. 26; 250/211 R, 211 J; 330/22

[56] References Cited

UNITED STATES PATENTS

| | | | |
|---|---|---|---|
| 2,951,208 | 8/1960 | Barton | 330/22 |
| 3,584,146 | 6/1971 | Cath et al. | 178/7.2 |

*Primary Examiner*—Richard Murray
*Attorney, Agent, or Firm*—James D. Haynes

[57] ABSTRACT

A compensating circuit for leakage current comprising part of a signal from a semiconductor image sensor is provided in which a diode is positioned in thermal contact with the image sensor and is reverse biased to produce a leakage current proportional to the image sensor leakage current. Amplifying means is utilized to provide a diode leakage current signal proportional to the leakage current flowing through the diode and equal to the leakage current component of the image sensor signal. The diode leakage current signal and the image sensor signal are summed in a summing circuit such that the diode leakage current signal offsets the leakage current component of the image sensor signal. An output signal results in which the image sensor leakage current component is substantially eliminated.

9 Claims, 3 Drawing Figures

LEAKAGE CURRENT COMPENSATING CIRCUIT FOR SEMICONDUCTOR IMAGE SENSOR

BACKGROUND OF THE INVENTION

This invention relates to an improved semiconductor image sensing device and, more particularly, to means for compensating for the leakage current of a semiconductor image sensor.

Semiconductive imaging devices such as silicon diode vidicons used in television cameras produce a current signal comprising a video current signal proportional to light radiating on the imaging device and a dark current. The dark current is the current produced by the imaging device when no light is being received by it. The dark current is actually the leakage current of the imaging device and is exponentially dependent on the temperature of the imaging device. For example, a silicon diode vidicon has a leakage current which approximately doubles for each 10°C. temperature rise of the vidicon.

The effect of the imaging device leakage current is to cause a level shift in the total signal from the imaging device. This level shift results in a low contrast image when the scene being observed is viewed on a television monitor, which contrast image decreases as leakage current increases.

It is, accordingly, an object of this invention to substantially eliminate the effect of the imaging device leakage current in a simple and effective manner.

With these and other objects in view which will become apparent to one skilled in the art as the description proceeds, this invention resides in the novel construction, combination and arrangement of parts substantially as hereinafter described, and more particularly defined by the appended claims, it being understood that such changes in the precise embodiment of the herein disclosed invention are meant to be included as come within the scope of the claims.

SUMMARY OF THE INVENTION

The object of the invention is accomplished by providing novel circuitry, which can include a diode, an amplifier, and a summing circuit connected with a semiconductor image sensing device. A sensor signal is obtained from the image sensing device which is proportional to the light absorbed by the image sensing device and the leakage current of the device. The diode is maintained at substantially the same temperature as the image sensing device or at a constant temperature relative to the image sensing device. The diode is also biased such that a leakage current flows through it. The diode has an exponential temperature-leakage current characteristic such that the diode leakage current will have a constant leakage current relationship with the image sensing device. The diode leakage current is amplified by the amplifier to produce a diode leakage current signal equal to the leakage current signal component of the sensor signal. The amplified sensor signal and amplified diode leakage current signal are summed in the summing circuit so that an output signal results which is proportional to only the light absorbed by the sensing device.

BRIEF DESCRIPTION OF THE DRAWINGS

The accompanying drawing illustrates one complete embodiment of the invention according to the best model so far devised for the production application of the principles thereof, and in which.

DESCRIPTION OF THE PREFERRED EMBODIMENT

Figure 1:
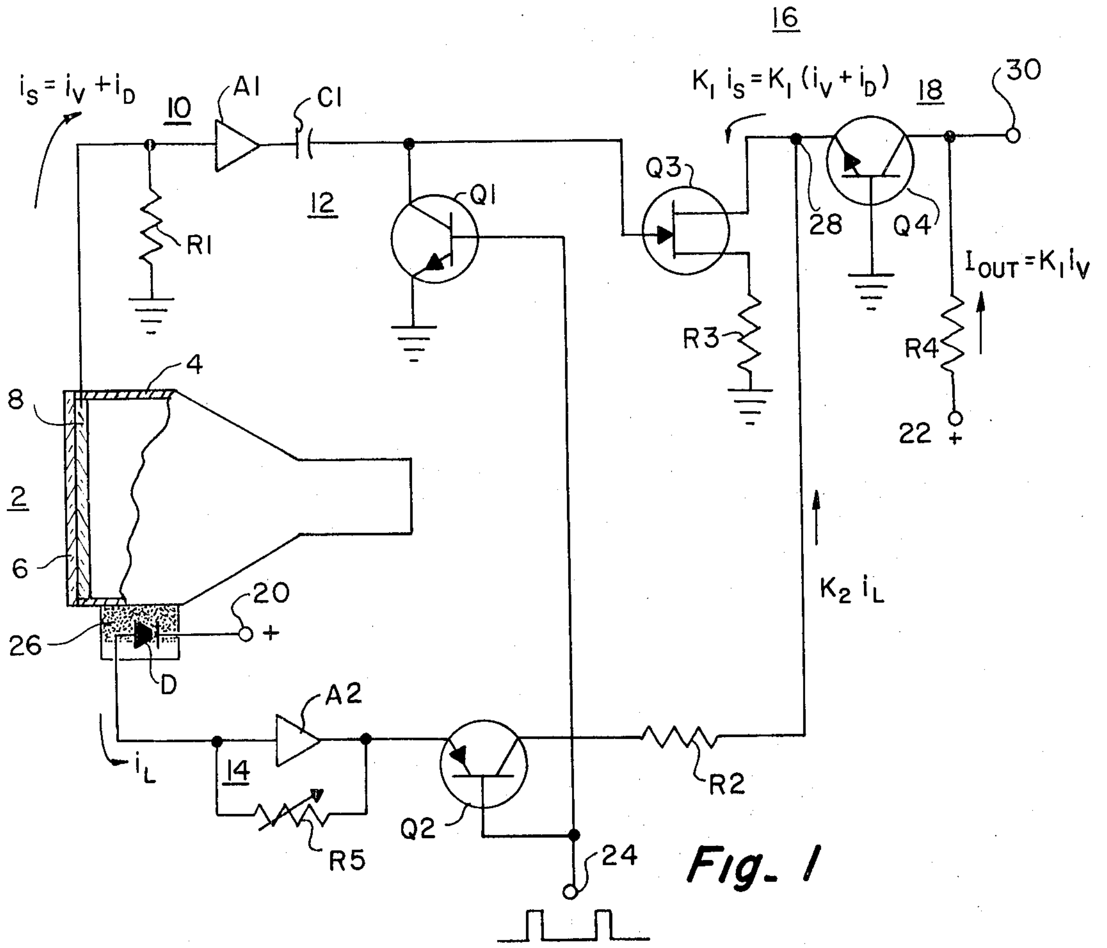
FIG. 1 is a schematic circuit diagram incorporating the instant invention.

In referring to FIG. 1 of the drawing, a camera tube is shown as having an envelope 4, a window 6 and an image sensor 8 positioned adjacent to the window 6 within the envelope. The image sensor 8 receives and absorbs light radiating from a scene to be imaged. The image sensor 8 is scanned periodically by an electron beam within the tube 2 in a well-known manner. As a result of charge received from the electron beam and the absorption of light by the image sensor 8, a sensor signal $i_s$ flows from the image sensor 8. The sensor signal $i_s$ has two components $i_V$ and $i_D$ where $i_V$ is the video current proportional to the level of light absorbed by the image sensor 8 and $i_D$ is the image sensor leakage current or dark current proportional to the temperature of the image sensor 8.

Figure 2A:
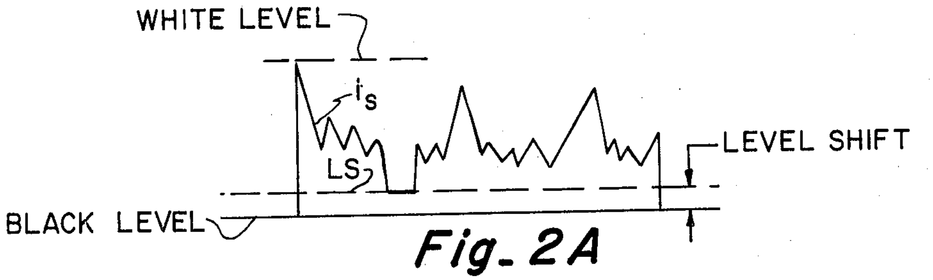
FIG. 2A is a waveform of the signal from an image sensing device operated at a high temperature in which leakage current is substantial.
Figure 2B:
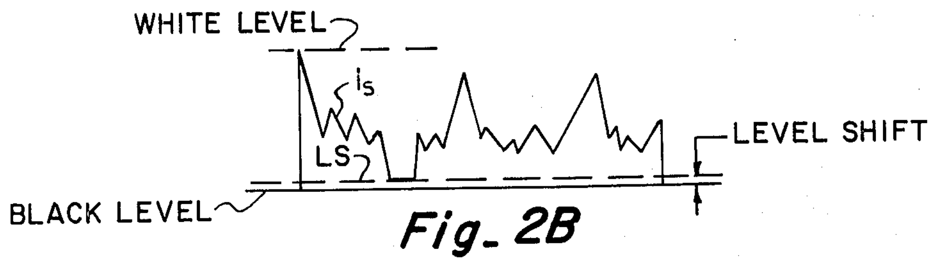
FIG. 2B is a waveform similar to that of FIG. 2A illustrating minimal level shift due to leakage current of the image sensing device operated at a low temperature.

A waveform representative of the sensor signal $i_S$ is illustrated in FIG. 2A. The indicated level shift shown in FIG. 2A is due to the leakage current component $i_D$ of the sensor signal $i_S$. The waveform shown in FIG. 2B represents a sensor signal $i_S$ which has the same video current $i_V$ as the waveform of FIG. 2A, but has a small leakage current $i_D$ and, consequently, only a minimum level shift. In both FIGS. 2A and 2B, the indicated black level and white levels respectively represent the normal maximum whiteness and blackness signal level that can be produced by the image sensor 8. The level shift line LS in both FIGS. 2A and 2B indicates the magnitude by which the contrast between the maximum dark level and white level is decreased due to leakage current $i_D$. In the waveform of FIG. 2B, there is only a small decrease in contrast. The waveform of FIG. 2B is similar to the waveform of the output signal produced when the compensating circuit of this invention is utilized.

The compensating circuit according to the invention includes an amplifying circuit 10, a DC restoring circuit 12, a summing circuit 16 and a compensating current circuit 14. A positive DC voltage (+) is connected to the terminals 20 and 22. A pulse train in synchronism with the electron beam scanning the image sensor 8 is applied to terminal 24, as shown in FIG. 1. The amplifying circuit 10 comprises a load resistor R1 connected between the image sensor 8 and ground and an amplifier A1 also connected to the image sensor 8 and to one side of the resistor R1. The DC restoring circuit 12 includes transistor Q1 and capacitor C1. The transistor Q1 has its emitter-collector circuit connected between the capacitor C1 and ground and its base connected to terminal 24. The compensating current circuit 14 comprises a diode D and an adjustable gain amplifier A2 connected to the anode of diode D and having an adjustable feedback resistor R5. As can be seen in FIG. 1, the amplifier A2 is connected to the anode of diode D. The amplifier A2 functions to convert the diode D leakage current $i_L$ to a voltage at its output that is proportional to the leakage current $i_L$. The transistor Q2 in circuit 14 has its emitter-collector circuit connected to amplifier A2 and its base connected to terminal 24. The diode D is positioned adjacent image sensor 8 and is held in thermal contact with the envelope 4 of camera tube 2 by a thermally conductive adhesive 26. The cathode of diode D is connected to terminal 20 and is reverse biased due to the positive DC voltage on terminal 20. The summing circuit 16 includes a current node point 28, a resistor R2, a resistor R3 having one side connected to ground and a field effect transistor Q3 having its drain and source circuit connected between the node point 28 and resistor R3 and its gate connected to one side of capacitor C1 and the collector of Q1.

An output circuit 18 is also provided and comprises an output resistor R4 connected to terminal 22, an output terminal 30 and a transistor Q4 having its collector-emitter circuit connected between the junction of terminal 30, resistor R4 and node point 28 and its base connected to ground.

A leakage compensating current $i_L$ will flow through the diode D due to its reverse bias and this current $i_L$ will be proportional to the temperature of diode D. Similarly to the current $i_D$ from image sensor 8, the current $i_L$ will approximately double for each 10°C. temperature rise of the diode. Due to the conduction of heat between diode D and image sensor 8, the temperature of diode D will be substantially the same as or have a constant relationship with the temperature of image sensor 8. The amplifier A2 produces an amplified output voltage signal equal to $i_L$R5 where adjustment of resistor R5 controls the gain of the amplifier. The current flowing through resistor R2, then, is $i_L$ R5/R2. If R5/R2 is represented by a constant $K_2$, the current flowing through transistor Q2 and to the node point 28 as a result of the compensating current $i_L$ from diode D is $K_2 i_L$.

The sensor signal $i_S$ flows through the load resistor R1 and develops a voltage $i_S$R1 proportional to currents $i_V$ and $i_D$ which is amplified by amplifier A1. The output signal from amplifier A1 is $i_S$AR1 where A represents the voltage gain of amplifier A1. The signal from amplifier A1 is restored to ground level by the restoring circuit 12. As previously mentioned, a pulse train in synchronism with the electron beam scanning the image sensor 8 is applied to terminal 24. During the return interval of the electron beam, a pulse from the pulse train appears at the bases of transistors Q1 and Q2. Transistor Q1, consequently conducts to shunt any signal from amplifier A1 to ground and transistor Q2 is maintained nonconductive so that no current flows from the collector of Q2. When the pulse is not present at the bases of transistor Q1 and Q2, signals from transistor Q2 and amplifier A1 respectively flow to the current node point 28 and the gate of transistor Q3.

In the summing circuit 16, the signal from amplifier A1 at the gate of transistor Q3 causes transistor Q3 to conduct an amplified current $K_1 i_S = K_1\ (i_V + i_D)$ where $K_1$ represents the constant $AR_1/R_3$. As previously mentioned, A is the voltage gain of amplifier A1. Since the currents $K_1\ (i_V + i_D)$ and $K_2 i_L$ flow in opposite directions relative to current node point 28 and are summed at node point 28, $i_{out} = K_1\ (i_V + i_D) - K_2 i_L$. By appropriate gain adjustment of amplifier A2, $K_2 i_L = K_1 i_D$ and therefore $i_{out} = K_1 i_V$ for all temperature conditions of the image sensor 8.

In the output circuit 18, conduction of transistor Q4 follows the potential at the emitter. Flow of current $i_{out}$ through transistor Q4 and output resistor R4 generates a video signal voltage at output terminal 30 which is proportional only to the video current $i_V$ from the camera tube 2. Referring again to FIG. 2B, the waveform shown has a shape the same as that representative of output current $i_{out}$ with the exception that no leakage current $i_D$ is included in the waveform representing current $i_{out}$.

A simple and effective means has thus been provided for compensating for the level shift of video signal due to leakage current from a semiconductor image sensor. Because, both semiconductor diodes and semiconductors used in camera tube image sensors have the same exponential temperature-leakage current characteristic, the leakage current of the diode in the instant invention will offset the leakage current of the image sensor throughout the full temperature range of the image sensor.

While only a specific embodiment of the invention has been described herein, other modifications thereof will be readily apparent to those skilled in the art without departing from the spirit and scope of the invention as defined in the appended claims.

What is claimed is:

1. In combination with image sensor means producing a sensor signal comprising a video current signal proportional to the level of light received by the image sensor and a leakage current signal proportional to the temperature of the image sensor means, a circuit comprising:

first circuit means responsive to thermal energy from the image sensor means for producing a compensating current signal proportional to said leakage current signal; and second circuit means connected to said first circuit means and the image sensor means for offsetting the leakage current signal with the compensating current signal, said second circuit means comprising a current node and a field effect transistor having its source connected to said node, the source current of said field effect transistor being proportional to said sensor signal, said current node summing said compensating current signal and said source current of said field effect transistor, said leakage current signal and said compensating current signal flowing in different directions relative to said current node whereby an output signal results which is proportional only to the level of light received by the image sensor means.

2. In combination with an image sensor means producing a sensor signal comprising video current signal proportional to the level of light received by the image sensor and a leakage current signal proportional to the temperature of the image sensor means, a circuit comprising:

a summing circuit comprising a current node and a field effect transistor having its source connected to said node, the source current of said field effect transistor being proportional to said sensor signal;

a compensating current circuit having its output connected to said current node, said compensating current circuit comprising diode means having a constant temperature relationship with said image sensor for producing a leakage current signal proportional to the temperature of said image sensor for producing a leakage current signal proportional to the temperature of said diode means, said diode means being reverse biased; curcuit means connected to the diode means and the image sensor for subtracting the diode means leakage current signal from the image sensor signal where an adjustable gain amplifier having an adjustable feedback loop, said adjustable gain amplifier being connected to said diode means;

means connecting the output of said image sensor means to the gate of said field effect transistor; and an output circuit means connected to said current node for providing a voltage output signal proportional only to the level of light received by said image sensor.

3. The circuit as set forth in claim 2 wherein said summing circuit further comprises a resistor, said resistor being connected between the drain of said field effect transistor and ground potential and wherein said compensating current circuit further comprises a transistor connected in the output circuit of said compensating current circuit, the output of said adjustable gain amplifier being connected to the emitter of said transistor.

4. The circuit set forth in claim 2 wherein said output circuit comprises a transistor and a resistor, said transistor having its emitter connected to said current node, it's base connected to a ground potential and it's collector connected to a first end of said resistor and as the output of said output circuit.

5. The circuit as set forth in claim 2 wherein said means connecting the output of said image sensor means to the gate of said field effect transistor comprises an amplifier, a transistor, a capacitor and a resistor, said amplifier having it's input connected to said output of said image sensor means and a first end of said resistor and it's output connected through said caacitor to said transistor and said gate of said field effect transistor.

6. The circuit as set forth in claim 2 wherein said summing circuit further comprises a first resistor, said first resistor being connected between the drain of said field effect transistor and ground potential; wherein said compensating current circuit further comprises a first transistor connected in the output circuit of said compensating current circuit, the output of said adjustable gain amplifier being connected to the emitter of said first transistor; wherein said output circuit comprises a second transistor and a first resistor, said second transistor having it's emitter connected to said current node, it's base connected to a ground potential and it's collector connected to a first end of said resistor and as the output of said output circuit; and wherein said means connecting the output of said image sensor means to the gate of said field effect transistor comprises an amplifier, a second transistor, a capacitor and a second resistor, said amplifier having it's input connected to said output of said image sensor means and a first end of said resistor and it's output connected through said capacitor to said second transistor and said gate of said field effect transistor.

7. The circuit as set forth in claim 6 wherein said first transistor and said second transistor are switched in synchronism with the electron beam of said image sensor to supress said sensor signal output and said leakage current signal during the return interval of the electron beam of said image sensor.

8. A dark current compensating circuit for use with an image sensor and producing a sensor current signal having a video current component proportional to the level of light received by the image sensor and a dark current component comprising the image sensor leakage current and being proportional to the temperature of the image sensor, said circuit comprising:

a diode positioned in thermal contact with said image sensor and being reverse biased, said diode having a leakage current signal proportional to its temperature; and circuit means connected to the image sensor and the diode and receiving the sensor current signal and the diode leakage current signal from different electrical directions for summing the sensor current signal and the diode leakage current signal whereby the diode leakage current compensates for the effect of the dark current.

9. The combination according to claim 8 wherein said diode and the image sensor each have the same leakage current-temperature characteristic.

* * * * *